United States Patent [19]
Christie

[11] 4,151,323
[45] Apr. 24, 1979

[54] PAPERMAKERS BELT

[75] Inventor: Donald R. Christie, Troy, N.Y.

[73] Assignee: Huyck Corporation, Wake Forest, N.C.

[21] Appl. No.: 817,324

[22] Filed: Jul. 20, 1977

Related U.S. Application Data

[63] Continuation of Ser. No. 547,309, Feb. 5, 1975, abandoned.

[51] Int. Cl.² .............................................. B32B 5/06
[52] U.S. Cl. .................................... 428/235; 156/148; 156/280; 428/234; 428/280; 428/284; 428/300; 428/301
[58] Field of Search ............... 428/198, 234, 235, 236, 428/280, 284, 300, 301, 302; 156/72, 148, 280; 162/205, 358

[56] References Cited

U.S. PATENT DOCUMENTS

| | | | |
|---|---|---|---|
| 2,115,581 | 4/1938 | Johnson | 156/148 |
| 3,214,327 | 10/1965 | Wicker et al. | 162/358 |

Primary Examiner—James J. Bell
Attorney, Agent, or Firm—Sanford S. Wadler

[57] ABSTRACT

Generally, this invention relates to multilayered belts for use in a papermaking machine which comprise a fibrous base layer the fibers of which are resin encapsulated, and a substantially resin-free fibrous surface layer in which the portions of the fibers which contact the fibers of the base layer are also substantially entirely encapsulated with resin. The invention includes within its scope a method of manufacturing such a belt.

11 Claims, 3 Drawing Figures

PAPERMAKERS BELT

This is a continuation of application Ser. No. 547,309, filed Feb. 5, 1975 now abandoned.

BACKGROUND OF THE INVENTION

It is known to treat an endless belt of fabric for use, for example, in the forming section of a papermaking machine, in a manner such that a resinous material will substantially impregnate the fabric. In this connection reference is made to Christie et al, U.S. Pat. No. 3,252,821. Such a method has been useful in substantially entirely impregnating such fabrics. Heretofore, however, it has not been possible to selectively resin encapsulate select fibers of a multilayered papermakers' belt. Such select encapsulation would be desirable in the manufacture of papermakers belts such as, for example, multilayered papermakers press felts in which the base layer fibers are substantially entirely encapsulated with resin while the fibers of the surface layer are resin free thereby producing a felt having a compressible surface layer and relatively incompressible base layer. In this connection reference is made to Wicker, U.S. Pat. No. 3,214,327. In attempting to produce a press felt in which the degree of compressibility of the surface and base layers differs numerous manufacturing and fabricating problems have been encountered. For example, if resin-treated multifilament or staple yarns are used to form the base layer, I have found that it is difficult to weave and needle such yarns due to their hard and stiff character. To overcome the forementioned problem other avenues of solution have been attempted. For example, it is known to produce a felt using a base fabric which has been resin-treated subsequent to the weaving thereof. However, in needling a fibrous surface layer to such a resin treated base layer hardness of the resin coating causes high needle loom wear and short and variable needle life. In addition, the adhesion of the surface layer to the base layer, as well as the dimensional stability of such felts, has been found to be less than optimum. Uniformity of surface layer application has also been less than optimum which has made reproduceability difficult. Another avenue of solution has been to bond together adjacent fibers in a papermakers' belt by the use of swelling agents, solvents and thermoplastic fibers having a low melting point. In this connection reference is made to Hindle et al, British Pat. No. 963,212 and Ford, British Pat. No. 801,440. In some instances this has been done to the base layer of papermakers belt subsequent to the needling of a surface layer thereto. See for example Lindcroth, Swedish Pat. No. 307,728. However, heretofore I am not aware of it having been possible to control the degree of permeability and compressibility of such a belt by selectively resin encapsulating select fibers of the belt.

Accordingly, it is an object of the present invention to make multilayered papermakers' belts having improved surface layer adhesion characteristics.

It is also an object of the present invention to make multilayered papermakers' belts having a uniform fibrous surface layer.

It is another object of the present invention to make multilayered papermakers' belt having easy reproduceability.

It is a further object of the present invention to make a multilayered papermakers' belt having desirable abrasion resistance and improved wear characteristics.

It is still a further object of the present invention to make a multilayered papermakers' belt having excellent dimensional stability.

It is yet another object of the present invention to provide for the selective resin encapsulation of the fibers of a multilayered papermakers' belt.

Another object of the present invention is to facilitate the weaving of the base layer of a multilayered resin-treated papermakers' belt.

Yet another object of the present invention is to facilitate the needling of a multilayered papermakers' belt to prevent damage to the needles and to reduce needle loom wear.

A further object of the present invention is to selectively control the degree of permeability and compressibility of a papermakers' belt by resin application.

SUMMARY OF THE INVENTION

These and other objects, as will be apparent to those skilled in the art may be achieved from the practice of the present invention one embodiment of which is a multilayered papermakers belt comprising a fibrous base layer having a top side and a bottom side and a substantially resin-free fibrous surface layer affixed to the top side of the base layer in which the fibers of the base layer are substantially entirely encapsulated with resin and in which the portions of the fibers of the surface layer which contact the fibers of the base layer are substantially entirely encapsulated with resin.

One embodiment of the method of the present invention comprises the steps of producing a papermakers' belt having a fibrous surface layer which is joined to the top side of a fibrous base layer. Resin is then selectively applied to the bottom side of the fibrous base layer so as to substantially entirely encapsulate the fibers of the base layer without substantially penetrating the fibrous surface layer except that the portions of the fibers of the fibrous surface layer which are in contact with the fibrous base layer become substantially entirely resin encapsulated.

An understanding of this invention may be had from the detailed discussion which follows and from an examination of the drawings in which:

DESCRIPTION OF THE PREFERRED EMBODIMENT

Figure 1:
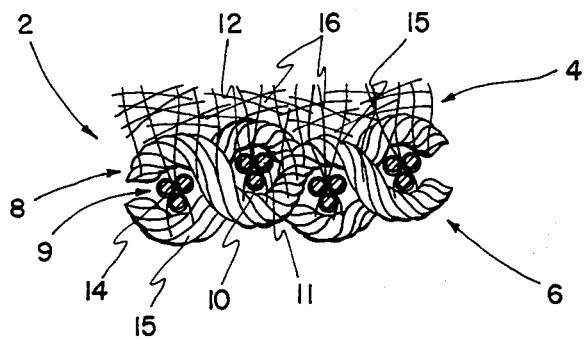
FIG. 1 is a cross-sectional view of one embodiment of this invention.
Figure 2:
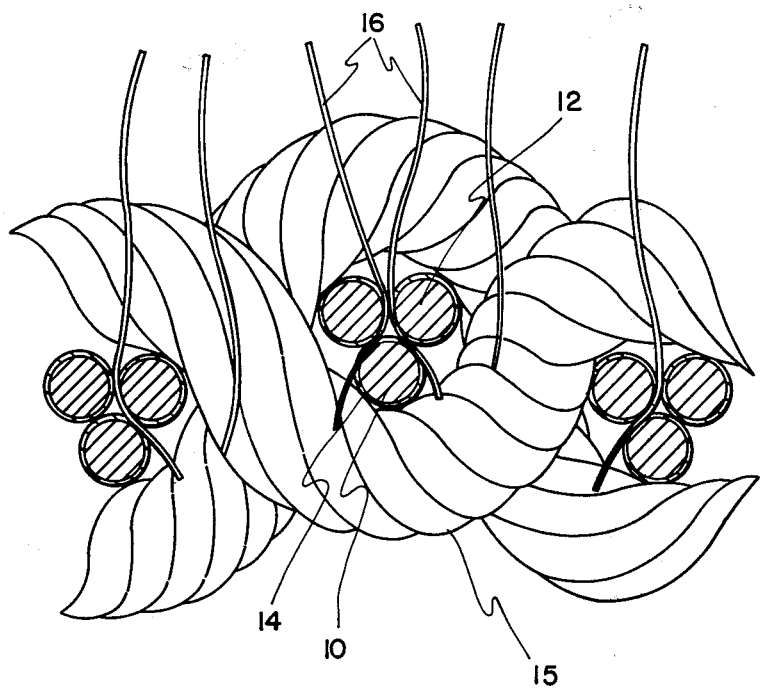
FIG. 2 is an enlarged fragmentary view of a portion of the papermakers' belt depicted in FIG. 1.

FIGS. 1 and 2 generally depict a preferred embodiment of the present invention. Illustrated in FIG. 1 is a multilayered papermakers' belt 2 made in accordance with the present invention which comprises a fibrous surface layer 4 and a fibrous base layer 6. By papermakers' belt is meant a fabric or felt for use in a papermaking machine constructed so that it is endless or conveyor belt-like, and which includes press and dryer felts, and forming, press and dryer fabrics. As noted above, the surface and and base layers comprise a fibrous material by which is meant that each layer may be composed of fibers or filaments, or yarns, or combinations thereof, in a woven or non woven structure. For example, the fibrous base and surface layer may each be of a woven or non-woven construction. Alternatively, the fibrous base layer may be of a woven construction and the fibrous surface layer may be of a non-woven construction, or visa versa. Examples of useful weave patterns are twill, plain and satin weave configurations although any other weave pattern may be useful. In those cases in which any of the fibrous layers comprise yarns such yarns may be in the form of staple or continous multifilament yarns. By way of example only, such yarns may comprise synthetic materials such as, for example, polyamides, polyesters, polypropylene, or acrylics, or may comprise natural fibers such as wool or cotton, or combinations of synthetic and/or natural yarns. In those cases in which any of the fibrous layers comprise fibrous material in addition to or in place of yarns such fibrous material may comprise similar synthetic and/or natural fibers, filaments or other strand-like material.

The surface layer 4 is joined to the top side 8 of the base layer 6 by any of a variety of means well known in the art. By way of example only, FIG. 1 depicts surface layer 4 as being needled to base layer 6. In another example of a joining means, surface layer 4 may be adhesively bonded to base layer 6, although other joining means may be used. The structure depicted in the drawings is illustrative of a papermakers felt and as such would ordinarily comprise a batt layer 4 having a paper contacting surface. However, as noted above the present invention is not limited to press felts but includes all the endless conveyor belt-like papermakers' belts used in the production of paper or paper-like products.

In some cases the surface layer may not be the paper-contacting layer. For example, a papermakers' belt may be produced in which a basic structure comprising a first layer or underlayer and a second layer is produced and a paper-contacting or third layer is affixed to the second layer thereby sandwiching the second layer between the under layer and paper-contacting layer. In such a case the object of the present invention may be to join the third or paper-contacting layer to the second or middle layer in which case the third layer would be considered the surface layer and the first and second layers would be considered the base layer. Alternatively, the object may be to join the second layer to the under layer in which case the under layer would be considered the base layer and the middle or second layer would be considered the surface layer. Obviously other combinations of layers is possible depending upon the end results desired and such end results can be achieved by selectively varying the degree of resin pick-up during the production of the papermakers' belt.

Referring to FIG. 2 which is an enlarged fragmentary view of a portion of the papermakers' belt 2 depicted in FIG. 1, it can be seen that the base layer 6 comprises continuous filament warp yarns 9 which include filaments or fibers 10, 11, 12 and continuous filament weft yarns 15 which are similar in construction to warp yarns 9 in that yarns 15 also comprise filaments or fibers similar to fibers 10, 11 and 12. Fibers 10, 11 and 12 of yarns 9 and the constituent fibers of yarns 15 are substantially entirely encapsulated with resin 14 by which is meant that the fibers 10, 11, 12 of yarns 9 and the corresponding fibers which comprise yarns 15 are substantially completely coated by the resinous solution while the yarns 9 and 15 remain substantially completely uncased with resin as depicted in FIG. 2. By the yarns being unencased it is meant that the constituent fibers of the yarns are substantially individually encapsulated units rather than the yarn itself being wholly encapsulated with resin. Although as noted herein other yarn types may be used, in the practice of the present invention, FIG. 1 depicts an end view of yarns 9 which yarns are multifilament yarns comprising continuous filaments or fibers 10, 11, 12. The surface layer 4 depicted in the drawings is non-woven and comprises fibers 16 which are substantially resin free by which is meant that the fibers 16 are substantially completely free of any resinous coating. However, to substantially increase the needled bond between the surface layer 4 and base layer 6 the portions of the surface layer fibers 16 which are in contact with the base layer 6 are substantially entirely encapsulated with resin thus leaving the remainder of the fiber 16 free of resin.

Without wishing to be bound by any particular theory it is thought that the encapsulation of the portions of fibers 16 with resin 14 substantially increases the batt adhesion to the base layer fibers by providing an additional adhesive bond between the constituent fibers of the base and surface layers.

Figure 3:
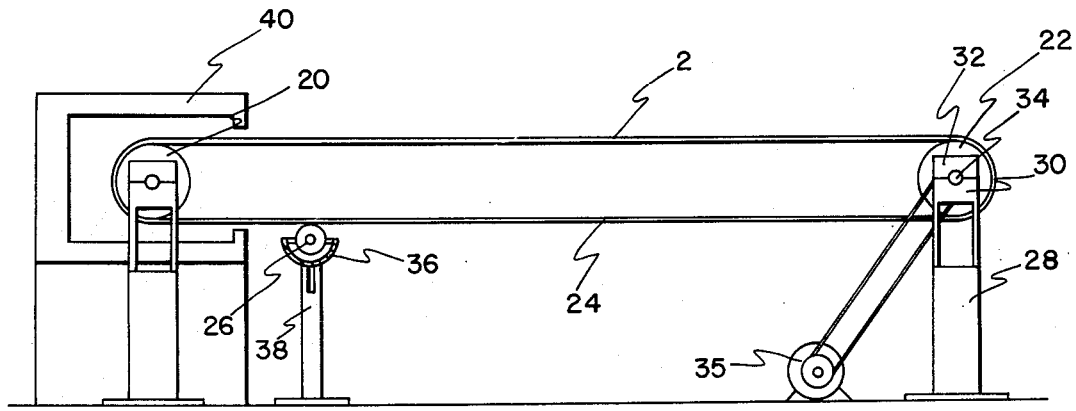
FIG. 3 is a view of a device on which a method for manufacturing felts which embody the present invention may be carried out.

Referring now to FIG. 3 a novel method of manufacturing the multilayered papermakers belt disclosed herein is shown. The device shown in FIG. 3 comprises a pair of parallel guide rolls 20 and 22 around which the papermakers' belt 2 is placed so that the bottom side 24 of the base layer 6 of the belt 2 is exposed to applicator roll 26. The guide roll 22 is supported by a standard 28 provided with bearings 30 and 32 to receive the opposite ends of the shaft 34 of the roll 22. By removing the bearing 32 the roll 22 may be lifted from the standard 28 to allow the roll 22 to be inserted internal of the conveyor belt like felt 2. Roll 20 is supported upon and may be removed from a standard in the same manner as is roll 22. Roll 22 may be provided with a belt driving means 35 for rotation of the roller 22 at a controlled speed in either direction.

The resin trough 36 is moveably affixed to a rigid support 38 such that trough 36 may be raised or lowered to bring the resin applicator roll 26 into and out of contact with the bottom side 24 of the papermakers belt 2. The roll 26 may be provided with a driving means for controlling the roll speed and direction or can be caused to rotate under the influence of the movement of the felt 2. Preferably, control means are used which allow the roll 26 to be driven in the same or different direction or at a greater or lesser speed than the papermakers' belt. The trough 36 is filled with any desired resin solution the choice of resin being dependent upon the felt characteristics desired. Resins which are suitable for use in practising the present invention include, but are not limited to, water-based resins such as Phenolics for example Bendix V1075, and acrylics such as Rhoplex AC-201 (produced by Rohm and Haas) and HYCAR 2600×172 (produced by B. F. Goodrich) and amino resins such as American Cyanamid's Aerotex M-3.

Although papermakers' belts produced in accordance with the present invention may be treated with resin as disclosed herein, and thereafter cured, if it is desired not to use curing means in practising the present invention, there are several resins that are commercially available which will cure at room temperature without the need for any curing apparatus. Two examples of resins compositions which may be useful in practising the present invention and which will cure at room temperature are epoxy resins such as a solution of Celanese Epi-Rez 510 dissolved in xylol, to which Epi-cure 8515 has been added, and polyurethane resins such as Nopco Chemicals Nopcothane D-503 which is also dissolved in xylol.

Although all of the foregoing resins can be used in the practice of the present invention, since papermakers' belts are custom made for each particular installation numerous other resins may be used either alone or in combination depending upon the results desired for the particular application.

After a suitable resin has been selected it is applied to the papermakers' belt 2 by rotating the belt 2 on the rollers 20 and 22 with the bottom side 24 of the fibrous base layer 6 exposed to rotating applicator roll 26. The roll has its lower hemisphere immersed in trough 36 which is filled with the desired resinous solution while part of the upper hemisphere is in contact with the bottom side 24 of the base layer of the papermakers' belt. The degree of wet resin pick-up can be controlled by a number of factors such as varying resin solution viscosity, solution solids, felt speed and applicator roll speed. In order to produce a papermakers felt in which the base layer is relatively incompressible and the surface layer is relatively compressible it may be desirable to control the degree of resin solution pick-up to between 40 and 100 percent of the total felt base layer weight. Of course, such limitations may vary depending upon the factors referred to immediately above which may be varied to control such resin pick-up. In order to assure uniform resin pick-up it is desirable to have the applicator roll 26 move in the same direction but at a greater speed than the papermakers belt 2.

If a desired resin requires a curing process suitable heating means such as a hot air oven 40 may be provided. Another example of a curing means would be to have rolls 20 and/or 22 heated. Naturally the precise curing temperature will be dependent upon the type of resin used. However, since most resins cure at between 250°-350° F. it may be desirable to construct curing means which will operate within that temperature range.

EXAMPLE I

In the first test results shown the control belt used had a base layer which was constructed with a broken-twill weave in which the warp yarns were 840 denier three ply continuous filament nylon and the weft yarns were 420 denier three ply continuous filament nylon. The fibrous surface layer of the control felt was a non-woven batt comprising 15 denier nylon staple fibers. The belt had 23 warp yarns per inch and 16 weft yarns per inch. The fibers of the yarns of the base layer of the control belt were encapsulated with phenolic resin in an amount equal to 15% of the base layer weight. The test belt embodied the present invention and was identical to the control belt except that in the control belt the fibers in the base layer were coated with phenolic resin before the batt was needled to the base layer and the fibers of the surface layer were substantially entirely free of resin encapsulation whereas the fibers in the yarns of the base layer of the test belt were treated with phenolic resin after the batt or surface layer was needled onto the fibrous base layer, and the portions of the fibers of the surface layer which contact the fibers of the base layer were also substantially entirely encapsulated with resin.

The control and test belts were positioned upon a test apparatus which simulated many of the operational characteristics of a papermaking machine and allowed to run for 16.5 hours each under identical operating conditions at which time various test results were measured as follows:

| TEST RESULTS | CONTROL FELT | TEST FELT |
| --- | --- | --- |
| Length Increase (%) | 2.2 | 0.60 |
| Width Increase (%) | 4.0 | 3.50 |
| Warp Strength (Pounds) | 418 | 546 |
| Weft Strength (Pounds) | 92 | 103 |
| Total Fiber Loss (Grains) | 340 | 29 |

From the foregoing data it is clear that the test felt exhibited superior dimensional stability in that the length of the control felt increased over 350% more than the length of the test felt, and the width of the control felt increased over 10% more than the width of the test felt. The warp and weft strength of the test felt was greater than that of the control felt and the fiber loss of the control felt was about 11 times more than that experienced by the test felt.

EXAMPLE II

Three identical belts were constructed comprised of a base layer woven with four-harness satin weave in which the weft yarns were 510 grain nylon staple yarn and the warp yarns were 270 grains 2 ply nylon staple yarn, onto which was needled a batt layer of 15 denier nylon staple fibers. One of the control fabrics was left untreated and was heat set at 360° F. for 10 minutes. The fibers of the yarns in the base layer of the second belt were encapsulated with resin before the fibrous batt was needled thereto, and the fibers of the surface layer were substantially entirely free of resin encapsulation. The resin application involved a two-step treatment in which the fabric was first treated with a 5% R 2170 (manufactured by Kopper's Company) solution which was then followed by a second treatment with an 18% solution of Aerotex M-3 (manufactured by American Cyanamid). The belt was then cured at 360° F. for 10 minutes. The test felt was identical in construction and treatment to control felt II except that the fibers of the yarns in the base layer were encapsulated with the above-mentioned resin after the batt was needled thereto and the portions of the fibers of the surface layer which contact the fibers of the base layer were also substantially entirely encapsulated with resin.

These belts were run on the test apparatus mentioned in the previous example until there was separation of the batt from the base layer. The results of this test were as follows:

| | Fiber Loss | Running Time |
| --- | --- | --- |
| Control Felt I (untreated) | 2284 grains | 1 hour |
| Control Felt II (base layer resin treated before needling) | 167 grains | 29 hours |
| Test Felt (base layer resin treated after needling) | 112 grains | 58 hours |

From the forementioned data it can be seen that the running time of the test felt was more than 2 times longer than control felt II and 58 times longer than control felt I. It should also be noted that the fiber loss of the test felt was 55% less than control felt II and 2172 grains less than control felt I.

EXAMPLE III

In example three control belts I and II were constructed woven with a four-harness satin weave in which the weft yarns were 510 grain nylon staple and the warp yarns were 840 denier 3 ply filament nylon. The belt had 12 weft yarns per inch and 21 warp yarns per inch. Control felt I was left untreated. The fibers of the yarns of the base layer of control Felt II were encapsulated with resin in an amount equal to about 18.6% of the total base layer weight. The test belt which embodies the present invention was identical to control belt II except that in the control belt the fibers of the yarns in the base layer were coated with resin before the batt was needled to the base layer and the fibers of the surface layer were substantially entirely free of resin encapsulation, whereas in the test felt the fibers of the yarns in the base layer were treated with resin after the batt or surface layer was needled onto the base layer and the portions of the fibers of the surface layer which contact the fibers of the base layer were also substantially entirely resin encapsulated. The fibers of the yarns of the test belt were coated with an amount of resin equal to about 19.8% of the total base layer weight. For both coated belts the resin encapsulating process was identical to that described in example II.

These belts were used to evaluate the batt adhesion by determining the force required to pull out a weft yarn from a given belt. The following results were obtained:

|  | Force in pounds required to pull out one weft yarn |
| --- | --- |
| Control Felt I (untreated) | 0.33 |
| Control Felt II (base layer treated before needling) | 3.7 |
| Test Felt (base layer treated after needling) | 6.3 |

As can be seen from the data obtained the force required to pull out a weft yarn was almost 90% greater in the test felt than in control felt II and 1800% greater than in control felt I.

From the foregoing compilation of data it is clear that papermakers belts made in accordance with the present invention possess far greater batt adhesion and dimensional stability than identical belts made in accordance with other methods which are known.

It is to be understood that the embodiments herein illustrated and discussed, and the terms and expressions which have been by way of illustration and not of limitation and that there is no intention in using any of them to exclude any equivalents of the features shown or described, or portions thereof, since it will be recognized by those skilled in the arts that this invention may be practiced in a wide variety of forms and embodiments without departing from the spirit and scope of this invention.

I claim:

1. A multilayered papermakers' belt which comprises a substantially resin-free fibrous surface layer which is joined by needling to the top side of a fibrous base layer having a top side and bottom side and in which the fibers of said base layer are substantially entirely encapsulated with resin and in which the portions of the surface layer fibers in contact with said base layer are substantially entirely encapsulated with resin.

2. A multilayered dryer felt which comprises a substantially resin-free non-woven fibrous surface layer which is joined by needling to the top side of a woven base layer having a top side and a bottom side and in which the fibers of the yarns of said base layer are substantially and entirely encapsulated with resin, and the portions of the fibers which comprise said surface layer and which are in contact with the fibers of said base layer fibers are substantially entirely encapsulated with resin.

3. A multilayered press felt which comprises a substantially resin-free non-woven fibrous surface layer which is joined by needling to the top side of a woven base layer having a top side and a bottom side and in which the fibers of the yarns of said base layer are substantially entirely encapsulated with resin, and the portions of the fibers which comprise said surface layer and which are in contact with said base layer fibers are substantially encapsulated with resin.

4. A belt as recited in claim 1 wherein said base layer is woven from warp and weft yarns and said surface layer comprises a batt which is joined to said base layer by needling, and wherein the fibers of said base yarns and the batt fibers in contact with the fibers which comprise said yarns are substantially entirely encapsulated by a thermosetting resin.

5. A belt as recited in claim 4 wherein said surface and base layers comprise nylon and said resin is a phenolic resin.

6. A press felt which comprises a woven nylon batt surface layer joined to a woven nylon base layer by needling, the fibers of the yarns of said base layer yarns and the batt fibers in contact with the fibers which comprise said yarns being substantially entirely encapsulated by a thermosetting resin.

7. A method of manufacturing a multilayered papermakers' belt comprising the steps of producing a fibrous surface layer and a fibrous base layer having a top side and a bottom side, joining by needling the surface layer to said top side, and selectively applying controlled amounts of resin to said bottom side so as to substantially entirely encapsulate the fibers in said base layer and substantially entirely encapsulating the portions of the surface layer fibers in contact with said base layer fibers.

8. A method as recited in claim 7 wherein said surface layer is joined to said base layer by needling said layers together.

9. A method as recited in claim 8 wherein said resin treated belt is cured at between 280° F. and 350° F.

10. A method of manufacturing a multilayered press felt comprising the steps of weaving a base layer woven from multifilament nylon yarns having a top side and a bottom side, joining said top side to a non-woven nylon batt by needling, selectively applying controlled amounts of a thermosetting phenolic resin to said bottom side so as to substantially encapsulate the fibers in said yarns and substantially entirely encapsulating the portions of said batt in contact with said base layer, and curing said resin at about 350 degrees F.

11. A multilayered press felt which comprises a substantially resin-free non-woven fibrous nylon batt layer which is needled to the top side of a base layer woven from multifilament nylon yarns having a top side and a bottom side and in which the fibers of the yarns of the woven base layer are substantially entirely encapsulated with said resin and the portion of said batt fibers in contact with the fibers of said base layer yarns are substantially entirely encapsulated with said resin.

* * * * *